Sept. 25, 1934.  B. F. HAWLEY  1,974,491
JACK
Filed July 13, 1933   2 Sheets-Sheet 1
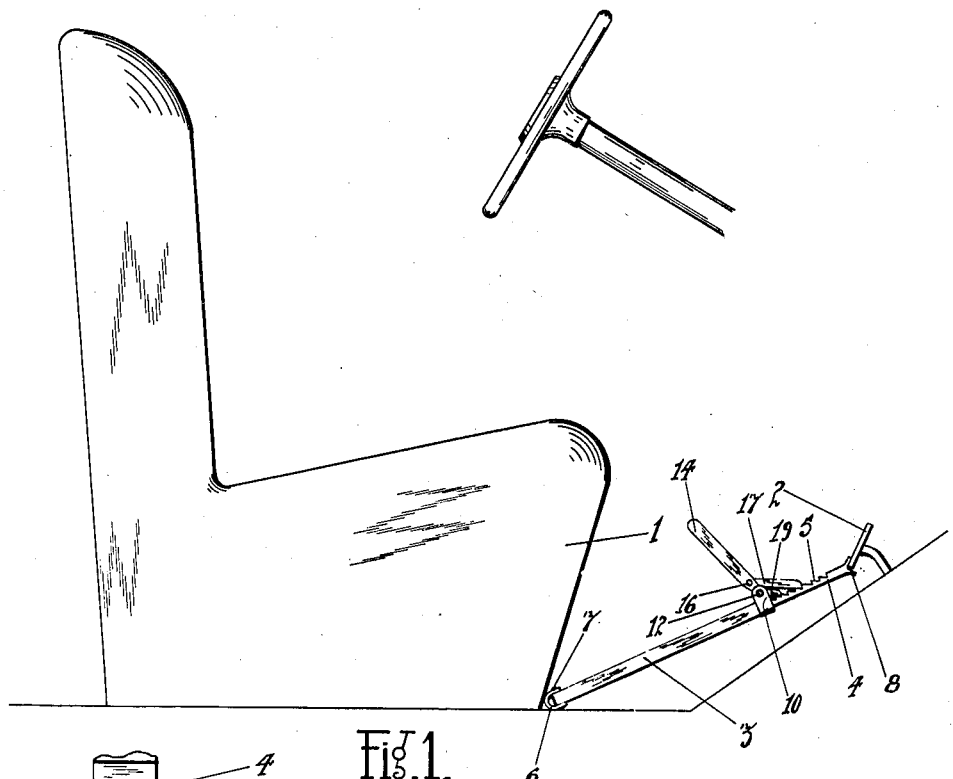
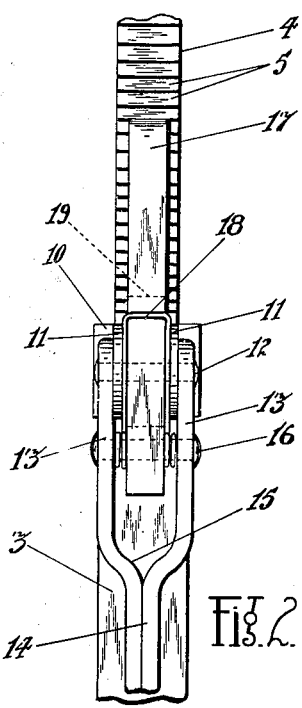
INVENTOR.
BERT F. HAWLEY.
BY
ATTORNEY.

Sept. 25, 1934.  B. F. HAWLEY  1,974,491
JACK
Filed July 13, 1933  2 Sheets-Sheet 2
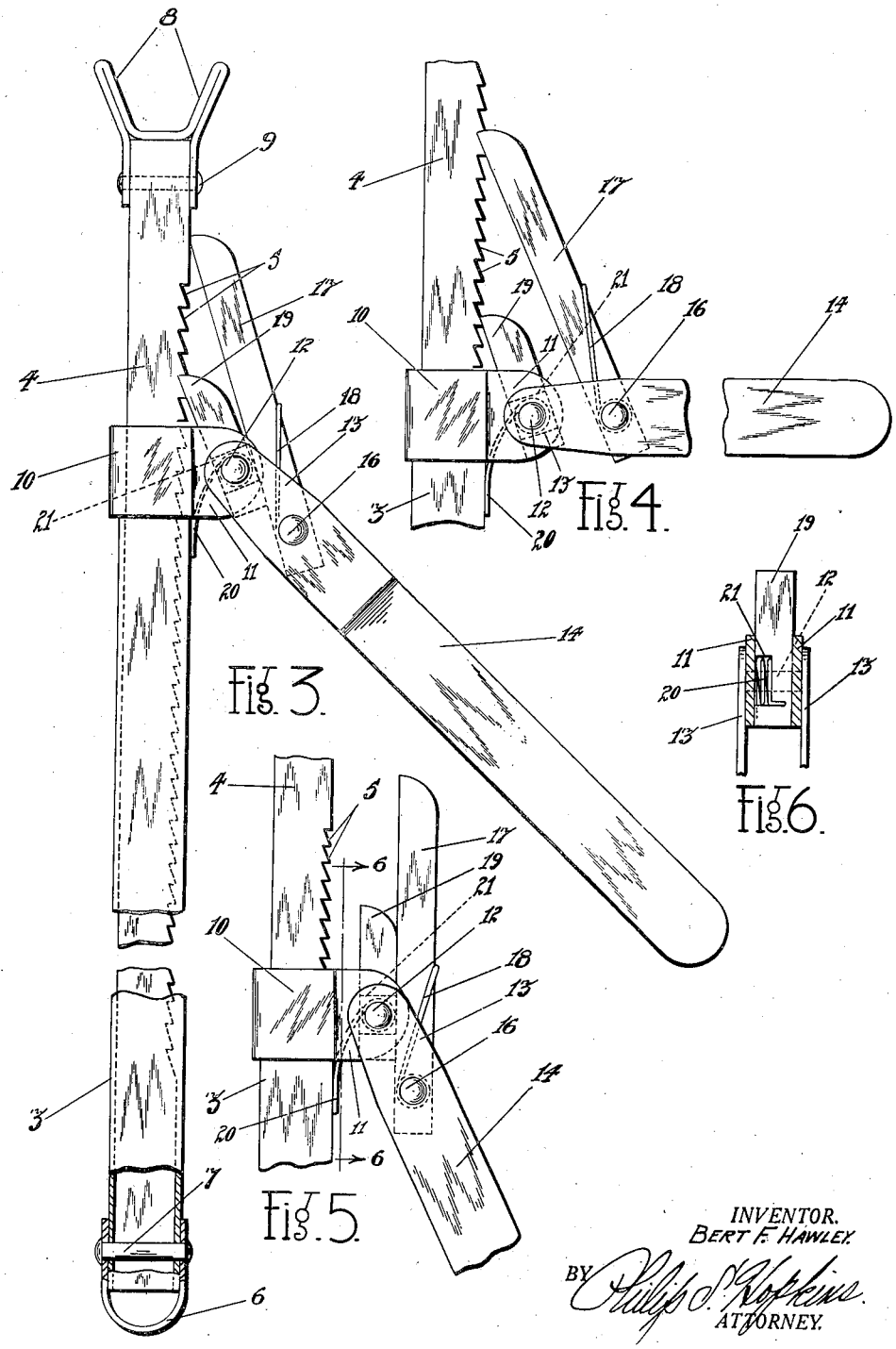
INVENTOR.
BERT F. HAWLEY
BY
ATTORNEY.

Patented Sept. 25, 1934

1,974,491

UNITED STATES PATENT OFFICE 1,974,491

JACK

Bert F. Hawley, Conklin, N. Y., assignor of fifty-one per cent to William H. Hill, Johnson City, N. Y.

Application July 13, 1933, Serial No. 680,232

4 Claims. (Cl. 254—108)

My invention relates to jacks and particularly to a jack designed for use with the brake pedal of an automobile whereby such pedal may be readily adjusted and held in adjusted position during the testing and adjustment of the brake mechanism and which may be quickly and easily released when the adjustments have been made.

An important feature of my invention lies in the provision of means for extending the jack arm and for holding it in its extended position upon manipulation in one direction and for instantly releasing the jack arm, upon movement in the opposite direction.

More specifically my invention comprises a jack including telescoping members, the inner one of which is provided with rack teeth whereby the same may be extended step by step and an actuating member comprising a handle and two pawls, one for extending the toothed jack arm and the other for holding it in extended position, the assembly of the handle and these pawls being such that movement of the handle in one direction releases both pawls simultaneously from the jack arm, thus freeing it to resume its position within the outer casing.

Other objects and advantages will be apparent as the description proceeds, reference now being had to the figures of the accompanying drawings forming a part of this application and wherein like reference numerals indicate like parts.

In the drawings:

Figure 1 is a diagrammatic view illustrating an automobile seat and brake pedal, and with my improved jack in operative position as in use.

Figure 2 is a detail front view of a portion of my improved jack.

Figure 3 is a side view of the jack.

Figure 4 is a detail view illustrating the operation of the extending means for the jack.

Figure 5 is a detail view illustrating the parts in position of release for the jack arm.

Figure 6 is a detail view illustrating the pivot and tension means for the operating handle and pawls, taken on the line 6—6 of Figure 5.

The reference character 1 indicates generally the front seat of an automobile and 2 represents the brake pedal thereof. It is well known that when the brakes of an automobile are to be adjusted, the practice is to depress the brake pedal 2 to a certain desired position where it must be held during the brake adjusting procedure. Heretofore this has been a rather difficult thing particularly where one person must of necessity perform all the operations. Makeshift devices have been used for holding the brake pedal in the desired position, such as sticks, boards, and the like wedged in between the front seat and the brake pedal. This has been unsatisfactory as it is often difficult to find a board or other device of the exact right length for the purpose desired. My improved jack has been designed particularly for this purpose although it will be clear that by slight modifications it may be utilized for other purposes as well.

My improved jack comprises the outer hollow casing 3 within which is telescoped the adjustable jack arm 4 provided along one edge with rack teeth 5. At the closed end of the casing 3 there is provided a rounded shoe or buffer member 6 suitably secured to the casing as by the rivet 7 for bearing against the lower front edge of the automobile seat 1 at the point where it meets the floor board of the car. This rounded shoe 6 prevents the tool from marring the seat 1 or the floor board covering.

The extended end of the jack arm 4 is provided with a bifurcated jaw 8 preferably formed of a single strip of material bent as shown clearly in Figure 3 and rigidly secured to the end of the jack arm as by the rivet 9.

Provided at the open end of the casing 3 is a bracket 10 provided with laterally extending ears 11 between which the pintle 12 is rotatably mounted. Secured to the pintle 12 for rotation therewith and at the outer ends thereof are the bifurcated end portions 13 of a handle 14 preferably made of one piece as shown clearly in Figure 2, bent upon itself, the free ends being spread apart as at 15.

Extending between the spaced end portions 13 of the handle 14 is a second pintle 16 to which is pivoted the lifting pawl 17, the free end of which is adapted to engage with the teeth 5 of the jack arm. A coil spring 18 is disposed about the pintle 16 and has one end thereof arranged on the upper side of the pawl 17 whereby to normally urge it into engagement with the teeth 5.

From Figures 3 and 4 it will be obvious that by lifting the handle 14 upwardly the pawl 17 will tend to move the jack arm 4 out of its casing 3.

Pivoted on the pintle 12 is a locking pawl 19, the free end of which is adapted to engage with the teeth 5. A coil spring 20 encircles the pintle 12 and is arranged with one end thereof engaging the upper side of the pawl 19 whereby the same is normally urged into tooth engaging position. It will be noted with reference to Figure 6 that the pivoted end of the pawl 19 is provided with a cutout portion 21 to receive the coils of the spring 20.

It will be noted that the pawl 17 directly overlies the pawl 19 and that the pivots 12 and 16 for the pawls are so disposed and spaced that with the handle 14 in the position shown in Figure 3 and in any position thereabove, the pawls will be in tooth engaging position. If, however, the handle 14 is moved downwardly from the position shown in Figure 3, as illustrated in Figure 5, the upper pawl 17 engages against the upper surface of the locking pawl 19 and rocks it on its pivot out of tooth engaging position thus freeing the jack arm 4 for free sliding movement back into the casing 3.

The operation of my invention is as follows: It being desired to hold the brake pedal 2 in a predetermined depressed position, the operator places the shoe 6 on the closed end of the casing 3 at the crotch formed by the front of the seat 1 and the floor board of the car and draws the jack arm 4 outwardly until the bifurcated end 8 thereof engages the lower edge of the surface of the brake pedal 2. The handle 14 is then reciprocated above the position shown in Figure 3 whereupon the pawl 17 step by step moves the jack arm 4 outwardly to depress the pedal 2, the locking pawl 19 holding the jack arm in its adjusted position.

As soon as the adjustment of the brakes has been completed, the operator merely presses inwardly upon the handle 14 against the tension of the springs 18 and 20, whereupon the pawls 17 and 19 are both withdrawn from the teeth 5 of the jack arm, thus releasing the arm to slide back into the sheath or casing 3.

It will thus be seen that I have provided a simple, inexpensive and easily adjusted jack which has particular usefulness as a pedal jack but which, of course, may find other uses without departing from the invention.

It will be understood, that changes may be made in details of construction and arrangement of parts without departing from the spirit and scope of my invention. I do not limit myself, therefore, to the exact form herein shown and described other than by the appended claims.

I claim:

1. A jack comprising an elongated hollow casing open at one end only, a jack arm slidable therein and projecting from said open end, an operating handle pivoted adjacent the open end of said casing and having an adjusting pawl thereon for moving said jack arm outwardly, a locking pawl for holding said arm in adjusted position, said pawls being engageable with said arm outside said casing and so arranged with respect to each other that movement of said handle to one position releases both said pawls from engagement with said jack arm.

2. A jack comprising a casing, a rounded shoe on one end thereof for engaging a support, a jack arm slidably mounted in said casing and having at its outer free end a bifurcated pedal engaging member, means for extending and holding said jack arm outwardly from said casing, and means for releasing said holding means.

3. A jack comprising an elongated hollow casing, a rounded shoe on one end thereof, a toothed jack arm slidably mounted in said casing and adapted for extension therefrom, an operating handle pivoted on said casing, a pawl pivoted to said handle and adapted upon reciprocation thereof through a certain arc to move said arm outwardly, a locking pawl pivoted concentric with said handle for holding said arm in extended position the engagement of said pawls with said arm being outside said casing, said pawls and said handle being so associated that movement of said handle through a different arc than that first named releases both of said pawls and permits the return of said arm in said casing.

4. A jack comprising an elongated hollow casing, a rounded shoe on one end thereof, a toothed jack arm slidably mounted in said casing, and adapted for extension therefrom, an operating handle pivoted on said casing, a pawl pivoted to said handle and adapted upon reciprocation thereof through a certain arc to move said arm outwardly, a locking pawl pivoted concentric with said handle for holding said arm in extended position, the engagement of said pawls with said arm being outside said casing, said pawls and said handle being so associated that movement of said handle through a different arc than that first named releases both of said pawls and permits the return of said arm in said casing, and means for normally urging said pawls to arm engaging position.

BERT F. HAWLEY.